United States Patent [19]
Duffield

[11] 3,731,968
[45] May 8, 1973

[54] CARGO VEHICLE CONSTRUCTION

[76] Inventor: Robert Duffield, R. D. No. 2, Box 178, New Alexandria, Pa. 15670

[22] Filed: June 4, 1971

[21] Appl. No.: 150,145

[52] U.S. Cl. ..................................296/10, 296/137 B
[51] Int. Cl. ...............................................B60p 3/42
[58] Field of Search ....................296/10, 100, 137 B

[56] References Cited

UNITED STATES PATENTS

| | | | |
|---|---|---|---|
| 3,186,756 | 6/1965 | Saut | 296/100 |
| 3,069,199 | 12/1962 | Reardon | 296/100 |
| 2,408,132 | 9/1946 | Weeks | 296/137 B |

*Primary Examiner*—Philip Goodman
*Attorney*—Buell, Blenko & Ziesenheim

[57] ABSTRACT

A convertible van construction is provided having a body with a pair of opposed side walls and a pair of end walls, one of said walls having access means into the van interior, said side and end walls defining an open top of said body, a pair of roof members hinged to the top edges of the two opposed side walls for selectively opening and closing said open top of said body, said pair of roof members being of generally equal size and shape and seal means at the edges of said roof members which join on closing.

4 Claims, 5 Drawing Figures

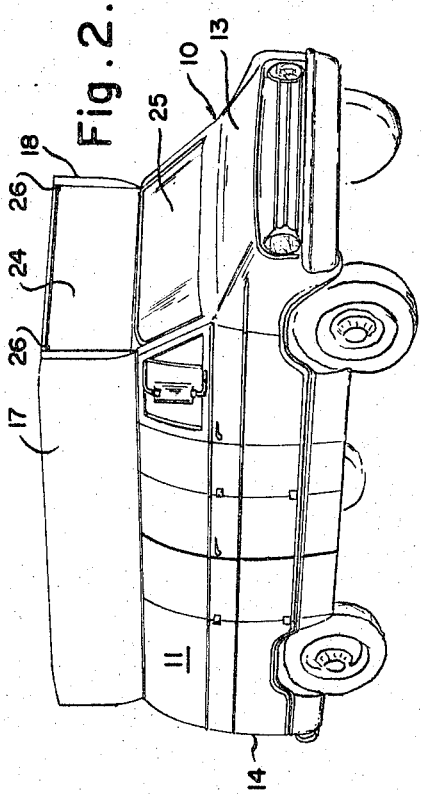
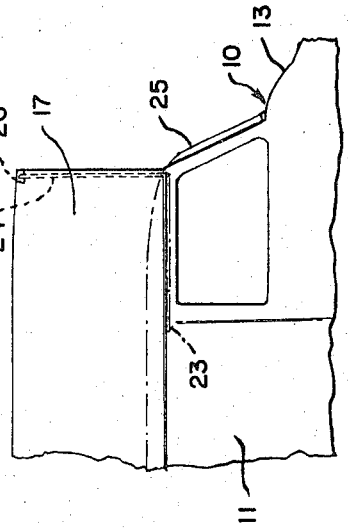
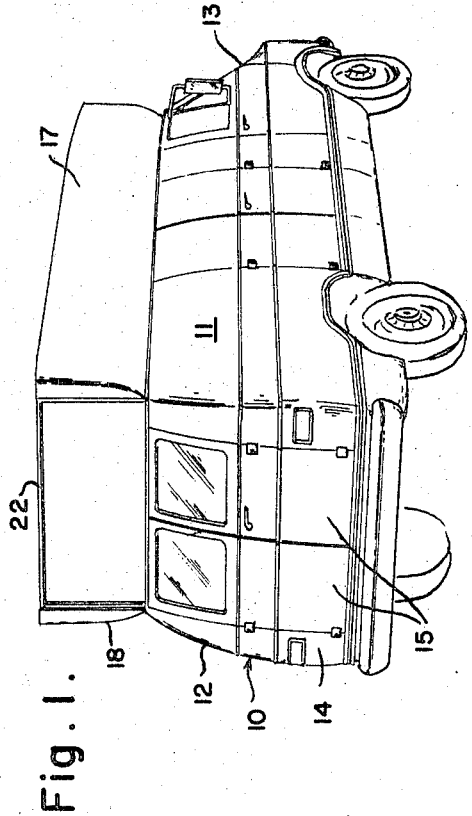
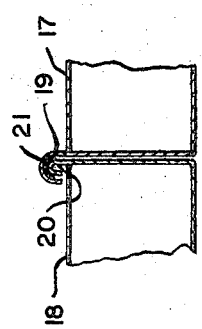
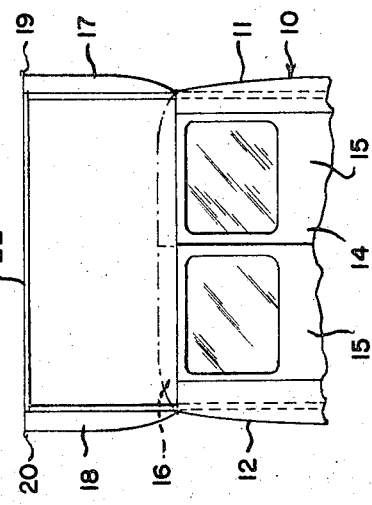
INVENTOR
Robert Duffield

CARGO VEHICLE CONSTRUCTION

This invention relates to a cargo vehicle construction and particularly to an improved roof construction which permits the maximum use of the cargo area for loads of unusual height.

There is a well known need in the area of light delivery trucks such as panel trucks for a vehicle body that has the features of both a closed van and an open truck vehicle. This is particularly true in those instances where the vehicle is used for transporting refrigerators, double oven ranges which are normally too high to be carried in their upright position.

In the past various efforts have been made to provide such a truck or cargo vehicle. For example Saut and Barker U.S. Pat. No. 3,186,756 discloses a truck body construction in which the top is slidable in a toggle and hinge member. In Zucker U.S. Pat. No. 3,292,971, the top is slidable to either side within a trackway at the ends of the body. Sangimino U.S. Pat. No. 3,298,731 shows a vehicle having a fabric top which can be rolled in either direction to open or close the cargo space. Galvin U.S. Pat. No. 3,423,126 shows still another form of fabric cover in which two fabric rolls are provided, one for each side half. There are dozens of other forms of removable cover for a cargo space to be found in the patent art. Unfortunately, none of these forms of cargo cover has proven to be practical or economical for small vans or panel trucks.

I have invented a new cargo body which overcomes the problems of prior art proposals. The cargo body of my invention is so constructed that it can readily be changed from closed to open position without the need for auxiliary equipment and without any problems of clearance. In addition, the roof provides side protection in the form of vertical extensions of the side walls in the open position.

Preferably I provide a convertible van construction which comprises in combination, a vehicle body having a pair of opposed side walls and a pair of end walls, one of said walls having access means into the van interior, said walls defining an open top of said body, a pair of roof members hinged to the top edge of two opposite side walls for selectively opening and closing said open top of said body, said pair of roof members being of generally equal size and shape, and seal means at the joining edges of said roof members. Preferably the access means into the van interior is a pair of doors at the rear end. The roof members preferably extend from the rear end of the vehicle to the front end, a hinged panel extends from a hinge at the front end to a point spaced from the front end, the portion of roof area from said spaced point to the front end being covered by a fixed roof member beneath the hinged panel. The spaced point is preferably above the rear of the drivers seat whereby the drivers compartment is covered by a fixed ceiling at all times. A removable header member is preferably inserted at the rear of the body to act as a frame for both the roof members and the access means.

In the foregoing general description of my invention I have set out certain objects, purposes and advantages of my invention. Other objects, purposes and advantages will be apparent from a consideration of the following description and the accompanying drawings in which:

FIG. 1 is an isometric view of a panel truck viewed from the right rear quarter incorporating my invention;

FIG. 2 is an isometric view of the panel truck of FIG. 1 viewed from the front right quarter;

FIG. 3 is a fragmentary rear elevational view of the truck of FIG. 1;

FIG. 4 is a fragmentary side elevational view of the truck of FIG. 1; and

FIG. 5 is a fragmentary section of the joint between the two roof members showing the sealing structure.

Referring to the drawings I have illustrated a van 10 having opposed sides 11 and 12 and a front end 13 and rear end 14. The rear end 14 is provided with a pair of access doors 15 into the cargo area. A removable frame header 16 connects the sidewalls 11 and 12 at the top of the doors 15 and forms a frame against which the doors 15 seat. A pair of roof members 17 and 18 are hinged along one edge to the top of each sidewall 11 and 12 respectively so that in the open position they form a vertical extension of the sidewalls and when closed they cover the opening between the side walls and the two ends. Preferably the roof members 17 and 18 are provided with upstanding interfitting U-shaped flanges 19 and 20 which form a water tight joint through gasket 21. In the open position the rear end of the roof members are held apart by a brace 22. At the front I provide a fixed ceiling panel 23 which extends from the front of the van to a position spaced from the front end and just behind the drivers seat and a hinged front panel 24 which is hinged to the front of the cab above the windshield 25 to be raised to the vertical position between the roof members 17 and 18 and fastened thereto by cooperating hinged clevises 26 at each end. The fixed ceiling panel 23 provides protection to the driver in wet and inclement weather, while the hinged front panel strengthens the roof members in their open position and protects the cargo.

While I have illustrated and described a presently preferred embodiment of my invention in the foregoing specification, it will be understood that this invention may be otherwise embodied within the scope of the following claims.

I claim:

1. A convertible van construction comprising in combination, a vehicle body having a pair of opposed side walls and a pair of end walls, one of said walls having access means into the van interior, said side and end walls defining an open top of said body, a pair of roof members hinged to the top edges of the two opposed side walls for selectively opening and closing said open top of said body, said pair of roof members being of generally equal size and shape and seal means at the edges of said roof members which join on closing, said seal means being a pair of vertically upstanding U-shaped interengaging flanges extending along the joining edges of the roof members and an elastomer gasket fixed to at least one of said flanges engaging between them.

2. A convertible van construction comprising in combination, a vehicle body having a pair of opposed side walls and a pair of end walls, one of said walls having access means into the van interior, said side and end walls defining an open top of said body, a pair of roof members hinged to the top edges of the two opposed side walls for selectively opening and closing said open top of said body, said pair of roof members being of generally equal size and shape and seal means at the edges of said roof members which join on closing, said fixed ceiling extending beneath the roof members from the front end to a point spaced from said front end whereby the seat area of the van is covered at all times.

3. A convertible van as claimed in claim 2 wherein a front panel member is hinged to the front end above the fixed ceiling and beneath the roof members and extends to said spaced point, said front panel member being movable to a vertical position between and engaging the roof members.

4. A convertible van as claimed in claim 3 wherein the access means is a pair of doors at the rear end of the van and a removable header frame member extending between the opposed side walls at the top of the access doors.

* * * * *